United States Patent
Matsumoto

(10) Patent No.: US 11,360,418 B2
(45) Date of Patent: Jun. 14, 2022

(54) IMAGE FORMING APPARATUS FOR NOTIFYING USER OF OPERATION OPTIONS, IMAGE FORMING SYSTEM, AND INFORMATION PROCESSING APPARATUS

(71) Applicant: CANON KABUSHIKI KAISHA, Tokyo (JP)

(72) Inventor: Yasuhisa Matsumoto, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/895,100

(22) Filed: Jun. 8, 2020

(65) Prior Publication Data

US 2020/0393786 A1    Dec. 17, 2020

(30) Foreign Application Priority Data

Jun. 12, 2019    (JP) .............................. JP2019-109624

(51) Int. Cl.
*G03G 15/00* (2006.01)
*G03G 21/20* (2006.01)

(52) U.S. Cl.
CPC ........... *G03G 15/50* (2013.01); *G03G 15/502* (2013.01); *G03G 15/5016* (2013.01); *G03G 15/5045* (2013.01); *G03G 21/20* (2013.01); *G03G 15/5037* (2013.01); *G03G 15/6576* (2013.01); *G03G 2215/00704* (2013.01); *G03G 2215/00717* (2013.01)

(58) Field of Classification Search
CPC .. G03G 15/50; G03G 15/502; G03G 15/5016; G03G 2215/00025
See application file for complete search history.

(56) References Cited

U.S. PATENT DOCUMENTS

| | | | |
|---|---|---|---|
| 9,383,954 B2 | 7/2016 | Ohhashi | |
| 9,473,660 B2 | 10/2016 | Mori | |
| 2010/0290068 A1* | 11/2010 | Okada | G03G 15/50 |
| | | | 358/1.9 |

FOREIGN PATENT DOCUMENTS

| | | |
|---|---|---|
| JP | 4784122 B | 10/2011 |
| JP | 2015095776 A | 5/2015 |
| JP | 2015195513 A | 11/2015 |
| JP | 2018157392 A | 10/2018 |

* cited by examiner

*Primary Examiner* — Thomas S Giampaolo, II
(74) *Attorney, Agent, or Firm* — Venable LLP

(57) ABSTRACT

An image forming apparatus that forms images on sheets, includes: a collection unit configured to collect history information relating to operation of the image forming apparatus; a selection unit configured to select, from among a plurality of accomplishment items, an accomplishment item relating to the operation of the image forming apparatus based on the history information; an acquisition unit configured to notify a user of one or more operation options related to the operation of the image forming apparatus that are for accomplishing the accomplishment item selected by the selection unit, and to acquire a selection result of whether or not the one or more operation options are to be used; and an operation control unit configured to control the operation of the image forming apparatus in accordance with the selection result.

26 Claims, 13 Drawing Sheets

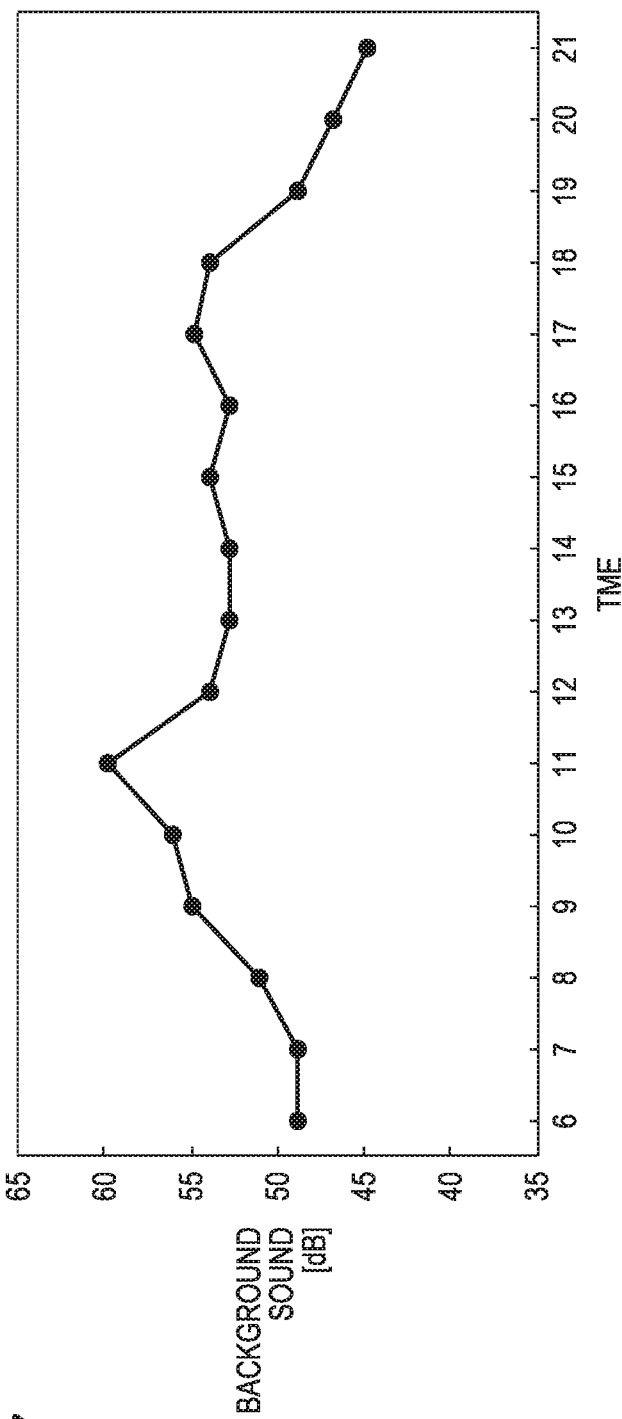

| ACCOM-PLISHMENT ITEM | | OPERATION OPTION | ACCOM-PLISHMENT DEGREE | DEMERIT | | | |
|---|---|---|---|---|---|---|---|
| | | | | PRODUCTIVITY DECREASE | IMAGE QUALITY DECREASE | POWER CONSUMPTION INCREASE | LIFE-SPAN DECREASE |
| CURL REDUCTION | 1 | EXTEND PRE-ROTATION AND ADEQUATELY HEAT FIXING UNIT | LOW | LOW | — | MEDIUM | LOW |
| | 2 | REDUCE TONER AND LOWER FIXING TEMPERATURE | LOW | — | MEDIUM | — | — |
| | 3 | HEAT FIXING UNIT ALSO DURING STANDBY | MEDIUM | — | — | HIGH | LOW |
| | 4 | REDUCE PROCESSING SPEED | HIGH | HIGH | — | — | LOW |

FIG. 9

THE CURL REDUCTION MODE SETTING SHOWN BELOW
ARE RECOMMENDED.

NO.1 PRE-ROTATION EXTENSION MODE
POWER CONSUMPTION INCREASED (INFLUENCE: MEDIUM),
CURL REDUCED (EFFECT: SMALL) APPLY PRE-ROTATION EXTENSION MODE?

- YES        - NO

NO.2 TONER SAVE MODE
IMAGE QUALITY DECREASED (INFLUENCE: MEDIUM),
CURL REDUCED (EFFECT: SMALL) APPLY TONER SAVE MODE?

- YES        - NO

NO.3 STANDBY HEATING MODE
POWER CONSUMPTION INCREASED (INFLUENCE: LARGE),
CURL REDUCED (EFFECT: MEDIUM) APPLY STANDBY HEATING MODE?

- YES        - NO

NO.4 REDUCED SPEED MODE
PRODUCTIVITY DECREASED (INFLUENCE: LARGE),
CURL REDUCED (EFFECT: LARGE) APPLY REDUCED SPEED MODE?

- YES        - NO

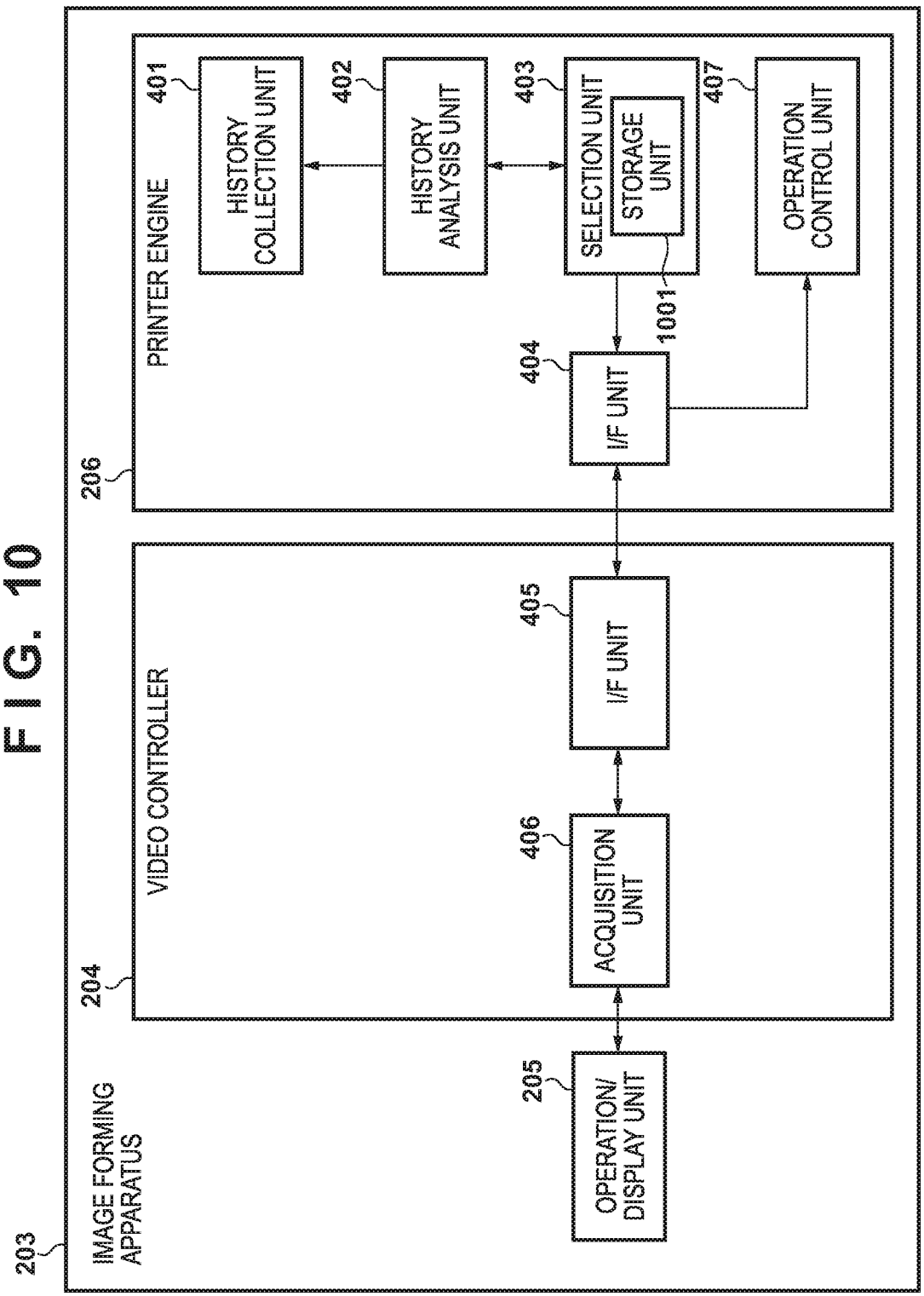

F I G. 12

| ACCOM-PLISHMENT ITEM | | OPERATION OPTION | EFFECT | DEMERIT | | | RESULT OF SELECTION |
|---|---|---|---|---|---|---|---|
| | | | | PRODUCTIVITY DECREASE | IMAGE QUALITY DECREASE | POWER CONSUMPTION INCREASE / LIFE-SPAN DECREASE | |
| CURL REDUCTION | 1 | EXTEND PRE-ROTATION AND ADEQUATELY HEAT FIXING UNIT | LOW | LOW | – | MEDIUM / LOW | × |
| | 2 | REDUCE TONER AND LOWER FIXING TEMPERATURE | LOW | – | MEDIUM | – / – | × |
| | 3 | HEAT FIXING UNIT ALSO DURING STANDBY | MEDIUM | – | – | HIGH / LOW | ○ |
| | 4 | REDUCE PROCESSING SPEED | HIGH | HIGH | – | – / LOW | × |
| QUIET AND PLEASANT SOUND | 1 | INCREASE ROTATION SPEED OF FAN | LOW | – | – | LOW / – | – |
| | 2 | REDUCE PROCESSING SPEED | HIGH | HIGH | – | – / LOW | – |

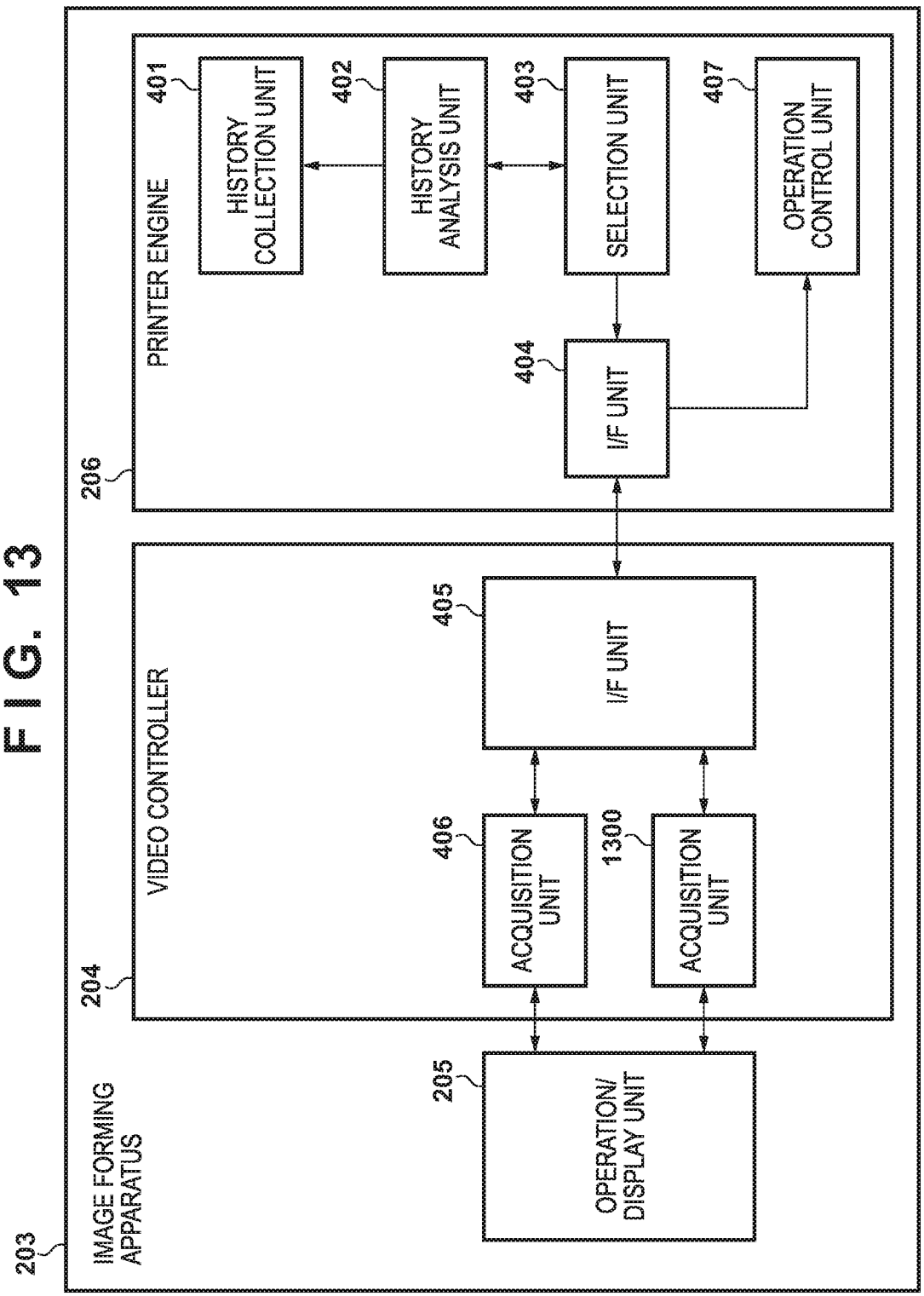

FIG. 14

| ACCOM-PLISHMENT ITEM | OPERATION OPTION | | APPLICATION LEVEL |
|---|---|---|---|
| CURL REDUCTION | EXTEND PRE-ROTATION AND ADEQUATELY HEAT FIXING UNIT | 0 | PRE-ROTATION EXTENSION TIME: 0s |
| | | 1 | PRE-ROTATION EXTENSION TIME: 5s |
| | | 2 | PRE-ROTATION EXTENSION TIME: 10s |
| | | 3 | PRE-ROTATION EXTENSION TIME: 15s |
| | ... | | |
| | REDUCE PROCESSING SPEED | 0 | PROCESSING SPEED: 1 SPEED |
| | | 1 | PROCESSING SPEED: 1/2 SPEED |
| | | 2 | PROCESSING SPEED: 1/3 SPEED |

FIG. 15

CURRENTLY, CURL REDUCTION MODE IS APPLIED.

WHAT IS THE ACCOMPLISHMENT DEGREE OF CURL REDUCTION?
- ACCOMPLISHED
- UNACCOMPLISHED

WHAT IS THE ACCEPTABILITY DEGREE OF THE PRINTER OPERATION?
- ACCEPTABLE
- UNACCEPTABLE

FIG. 16

|  | ACCEPTABLE | UNACCEPTABLE |
|---|---|---|
| ACCOMPLISHED | LEVEL MAINTAINED | 1 LEVEL DOWN |
| UNACCOMPLISHED | 1 LEVEL UP | LEVEL MAINTAINED |

IMAGE FORMING APPARATUS FOR NOTIFYING USER OF OPERATION OPTIONS, IMAGE FORMING SYSTEM, AND INFORMATION PROCESSING APPARATUS

BACKGROUND OF THE INVENTION

Field of the Invention

The present invention relates to an image forming apparatus such as a copier or a printer, an image forming system, and an information processing apparatus.

Description of the Related Art

A technique for optimizing an image forming operation by analyzing an operation history of an image forming apparatus is proposed. Japanese Patent No. 4784122 discloses that the time taken until a sheet is discharged onto a paper discharge tray is measured, and if the time increases, it is determined that the transport rollers have worn out, and the rotation speed of transport rollers is increased. Furthermore, a technique for optimizing an image forming operation by ascertaining user preferences is proposed. Japanese Patent Laid-Open No. 2015-95776 discloses a technique for performing adjustment so that an image to be formed has a color tone preferred by a user by ascertaining the color tone preferred by the user beforehand.

However, there are cases in which an image forming operation desired by a user cannot be performed by analyzing an operation history. For example, even if the processing speed is decreased to reduce curling in an environment in which curling is likely to occur, the consequent image forming operation would not be desirable for a user who desires high productivity. Furthermore, there are also cases in which an image forming operation is not optimized for a user even if an image forming operation desired by the user is prioritized over others. For example, in the case of an environment in which rear surfaces of sheets are likely to become dirty, there may be cases where rear surfaces of sheets are dirty and user satisfaction is reduced should cleaning frequency be reduced just because the user desires high productivity.

SUMMARY OF THE INVENTION

According to an aspect of the present invention, an image forming apparatus that forms images on sheets, includes: a collection unit configured to collect history information relating to operation of the image forming apparatus; a selection unit configured to select, from among a plurality of accomplishment items, an accomplishment item relating to the operation of the image forming apparatus based on the history information; an acquisition unit configured to notify a user of one or more operation options related to the operation of the image forming apparatus that are for accomplishing the accomplishment item selected by the selection unit, and to acquire a selection result of whether or not the one or more operation options are to be used; and an operation control unit configured to control the operation of the image forming apparatus in accordance with the selection result.

Further features of the present invention will become apparent from the following description of exemplary embodiments with reference to the attached drawings.

BRIEF DESCRIPTION OF THE DRAWINGS

FIG. 7 is a diagram illustrating an example of a history of background sound.

FIG. 8 is a diagram illustrating operation option information according to one embodiment.

FIG. 9 is a diagram illustrating an example of a screen for a user to input whether or not to use operation options.

FIG. 10 is a functional block diagram relating to control of an image forming apparatus according to one embodiment.

FIG. 12 is a diagram describing processing for determining whether or not to use operation options for quiet and pleasant sound.

FIG. 13 is a functional block diagram relating to control of an image forming apparatus according to one embodiment.

FIG. 14 is a diagram illustrating operation option information according to one embodiment.

FIG. 15 is a diagram illustrating an example of a screen presented to a user for application level control.

FIG. 16 is a diagram illustrating an example of control of application levels.

DESCRIPTION OF THE EMBODIMENTS

Figure 1:
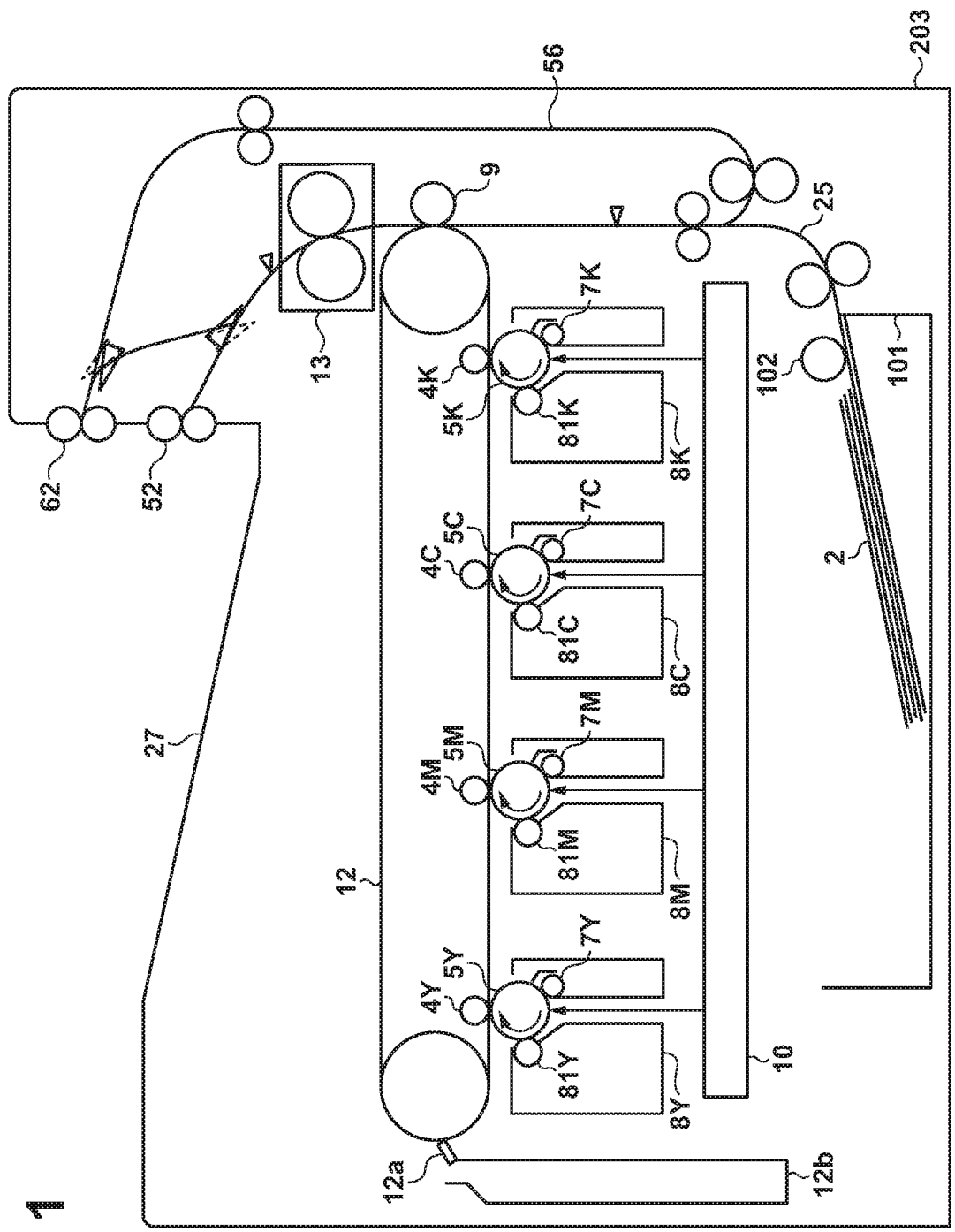
FIG. 1 is a configuration diagram of an image forming apparatus according to one embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a configuration diagram of an image forming apparatus 203 according to the present embodiment. In FIG. 1, the letters Y, M, C, and K at the end of reference symbols indicate that the members indicated by the reference symbols are involved in the forming of images of the colors yellow, magenta, cyan, and black, respectively. Note that, in the following description, reference symbols without letters at the end thereof are used if there is no need to distinguish between colors. Each photoreceptor 5 is driven to rotate in the clockwise direction in FIG. 1 during image forming. Each charging roller 7 uniformly charges the surface of the corresponding photoreceptor 5. A scanning unit 10 exposures/scans the photoreceptors 5 with light, and forms electrostatic latent images on the photoreceptors 5. A developing roller 81 of each developing unit 8 uses a developing bias voltage to develop the electrostatic latent image on the corresponding photoreceptor 5 with toner (a developer) and form a toner image (a developer image) on the photoreceptor 5. Note that the developing units 8Y, 8M, 8C, and 8K include yellow, magenta, cyan, and black toner, respectively. Each primary transfer roller 4 uses a primary transfer bias voltage to transfer the toner image on the corresponding photoreceptor 5 onto an intermediate transfer belt 12. Note that a full-color toner image can be formed on the intermediate transfer belt 12 by the toner images on the photoreceptors 5 being transferred onto the intermediate transfer belt 12 so as to overlap one another.

The intermediate transfer belt 12 is driven to rotate in the counter-clockwise direction in FIG. 1 during image forming. Meanwhile, a sheet 2 stored in a cassette 101 is fed onto a conveyance path 25 by a feed roller 102, and is then conveyed to a position facing a secondary transfer roller 9 by rollers provided along the conveyance path 25. The secondary transfer roller 9 uses a secondary transfer bias voltage to transfer the toner image on the intermediate transfer belt 12 onto the sheet 2. A blade 12a removes toner remaining on the intermediate transfer belt 12 without being transferred onto the sheet 2, and collects the removed toner into a container 12b. The sheet 2 with the toner image transferred thereon is conveyed to a fixing unit 13. The fixing unit 13 fixes the toner image onto the sheet 2 by heating and pressing the sheet 2. The sheet 2 with the toner image fixed thereon is discharged onto a discharge tray 27 by discharge rollers 52. Note that, if images are to be formed on both sides of the sheet 2, the sheet 2 with a toner image fixed on one side is conveyed toward reverse rollers 62 according to flapper setting, and is then conveyed toward a double-side conveyance path 56. Note that the image forming apparatus 203 includes a thermometer, a hygrometer, and a microphone for detecting temperature, humidity, and sound, none of which are illustrated.

Figure 2:
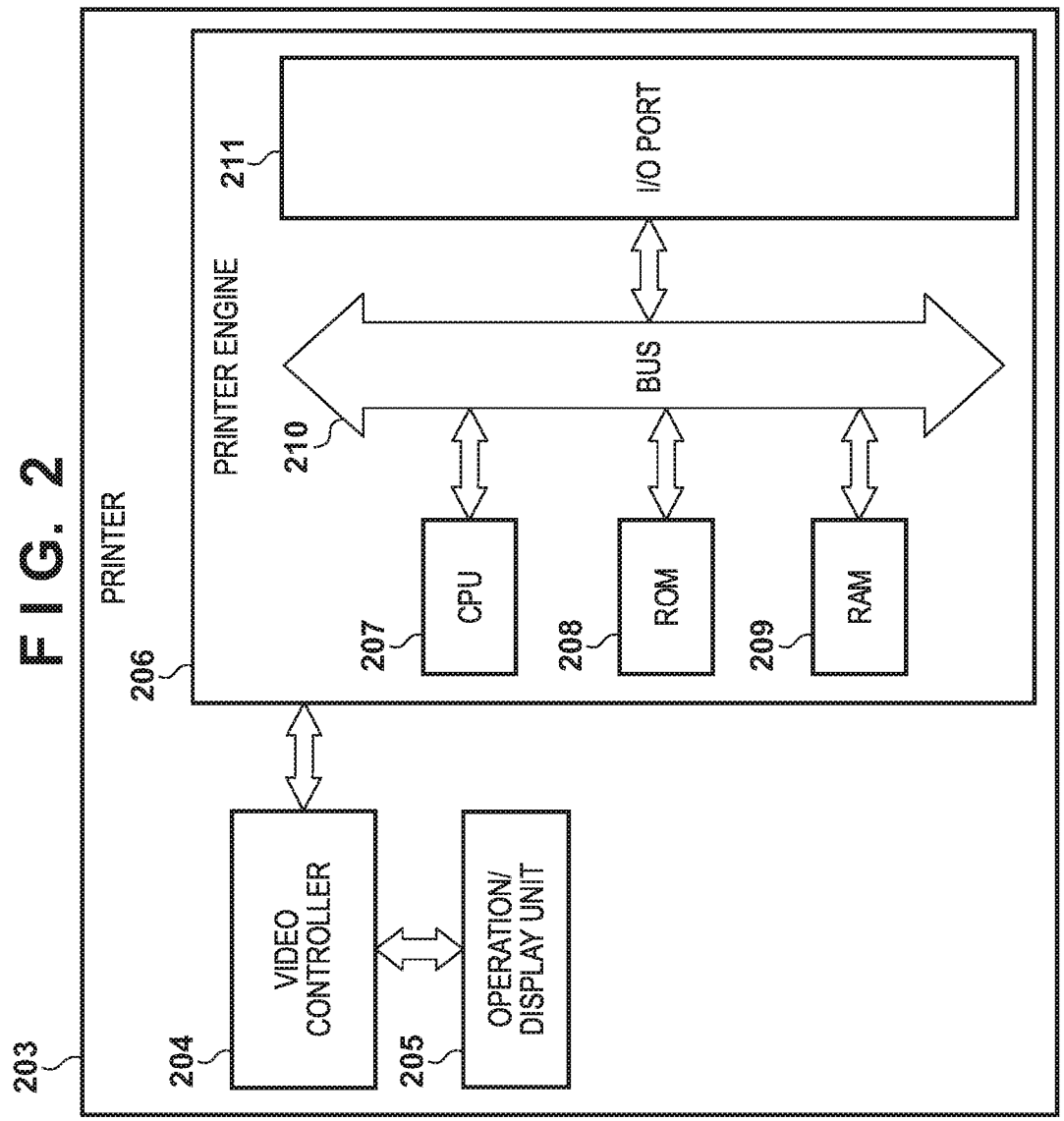
FIG. 2 is a hardware configuration diagram relating to control of the image forming apparatus according to one embodiment.

FIG. 2 is a control configuration diagram of the image forming apparatus 203. An operation/display unit 205 provides a user interface, and includes an operation panel, an operation button, etc. The image forming apparatus 203 displays the state of the image forming apparatus 203, etc., on the operation panel. Furthermore, a user can operate the image forming apparatus 203 using the operation panel and the operation button. A video controller 204 transmits, to a printer engine 206, image data and print operation instructions received from an unillustrated host computer. A ROM 208 of the printer engine 206 holds programs executed by a CPU 207 and various types of data used by the CPU 207 to control the image forming apparatus 203. The CPU 207 controls various operations relating to an image formation by executing the programs stored in the ROM 208. Note that, in doing so, the CPU 207 uses a RAM 209 as a working area. The CPU 207 can access the ROM 208, the RAM 209, and I/O ports 211 via a bus 210. The I/O ports 211 have unillustrated actuators connected thereto, and the CPU 207 controls actuators realizing sheet transport and image forming via the I/O ports 211.

Figure 3:
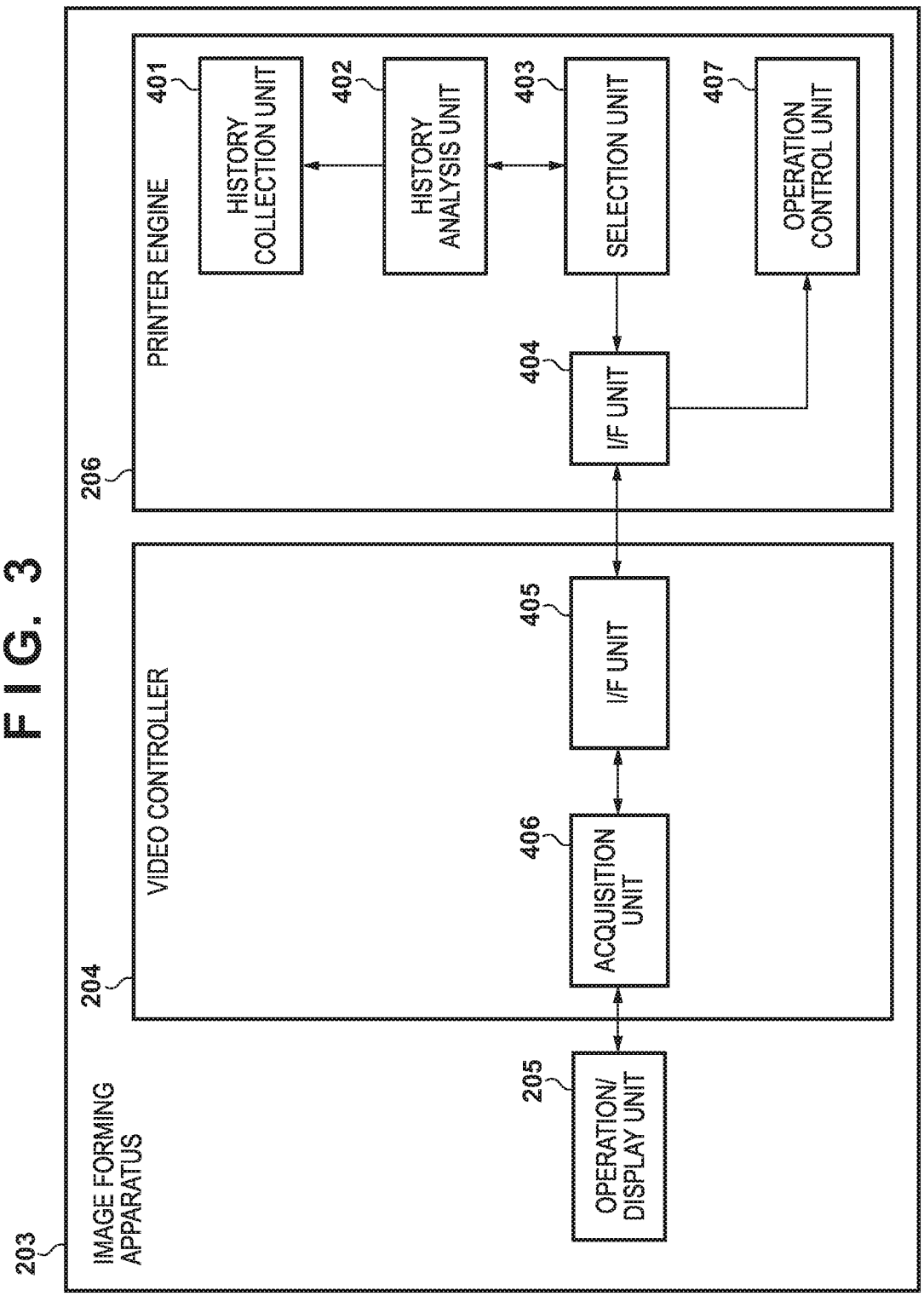
FIG. 3 is a functional block diagram relating to control of the image forming apparatus according to one embodiment.

FIG. 3 is a functional block diagram relating to control of the image forming apparatus 203 in the present embodiment. An I/F unit 404 and an I/F unit 405 are interface units, and handle the transmission and reception of data performed between the video controller 204 and the printer engine 206. A history collection unit 401 collects histories relating to the operation of the image forming apparatus 203, and accumulates the histories as history information. For example, the history information includes print history information regarding print processing, environment history information regarding the installation environment, error history information regarding errors and failures that have occurred, and state history information regarding states of the image forming apparatus 203. For example, the print history information includes, for each sheet printed, time information indicating the print date/time or time, fixing temperature information indicating the fixing temperature, information indicating various bias voltages, size information indicating sheet size, type information indicating sheet type, etc. The environment history information is history information regarding the installation environment of the image forming apparatus 203, and for example, may include temperature information, humidity information, and sound information respectively indicating a history of the ambient temperature, a history of the ambient humidity, a history of the ambient sound, etc. Note that the ambient humidity, the ambient temperature, and the ambient sound are acquired at regular intervals by an unillustrated humidity detection unit, temperature detection unit, and sound collection unit provided in the image forming apparatus 203, respectively. For example, the humidity detection unit, the temperature detection unit, and the sound collection unit are a hygrometer, a thermometer, and a microphone, respectively. The error history information is information indicating a history of jams that have occurred while printing sheets, warnings, failures that have occurred in the image forming apparatus 203, etc. The state history information is a history of operation states of the image forming apparatus 203, such as a standby state, a printing state, etc.

A history analysis unit 402 analyzes the history information collected and accumulated by the history collection unit 401. Based on the result of the analysis of the history information by the history analysis unit 402, a selection unit 403 selects an accomplishment item satisfying a selection criterion from among a plurality of accomplishment items, and notifies an acquisition unit 406 of the selected accomplishment item. An accomplishment item is a target that the image forming apparatus 203 is to accomplish during operation. For example, "curl reduction" may be the accomplishment item if suppressing the frequency at which curling of sheets occurs is the aim to be accomplished. Also, "quiet and pleasant sound" may be the accomplishment item if the aim to be accomplished is to prevent the operation sound of the image forming apparatus 203 from being unpleasant to the user. Furthermore, any target can be set as an accomplishment item, such targets include reducing the downtime of the image forming apparatus 203, improving the productivity of the image forming apparatus 203, improving the image quality of images formed by the image forming apparatus 203, reducing the frequency at which sheet jamming occurs, etc. The accomplishment items that the image forming apparatus 203 can provide are determined beforehand and set to the image forming apparatus 203.

Upon being notified of an accomplishment item from the selection unit 403, the acquisition unit 406 notifies the user, via the operation/display unit 205, of one or more operation options regarding operation conditions of the image forming apparatus 203 for achieving the accomplishment item that the acquisition unit 406 was notified of. For each operation option the user is notified of, the user provides input via the operation/display unit 205 as to whether or not an operation option is to be used, or in other words, whether or not the user selects an operation option. The acquisition unit 406 notifies an operation control unit 407 of the result of the user's selection of operation options. In accordance with the selected operation options, the operation control unit 407 controls the operation of the image forming apparatus 203 via the I/O ports 211. Note that selection by the user of whether or not operation options are to be used is not limited to being performed via the operation/display unit 205. For example, the video controller 204 can cause the host computer to display operation options, and the user can select whether or not operation options are to be used by operating the host computer.

Figure 4:
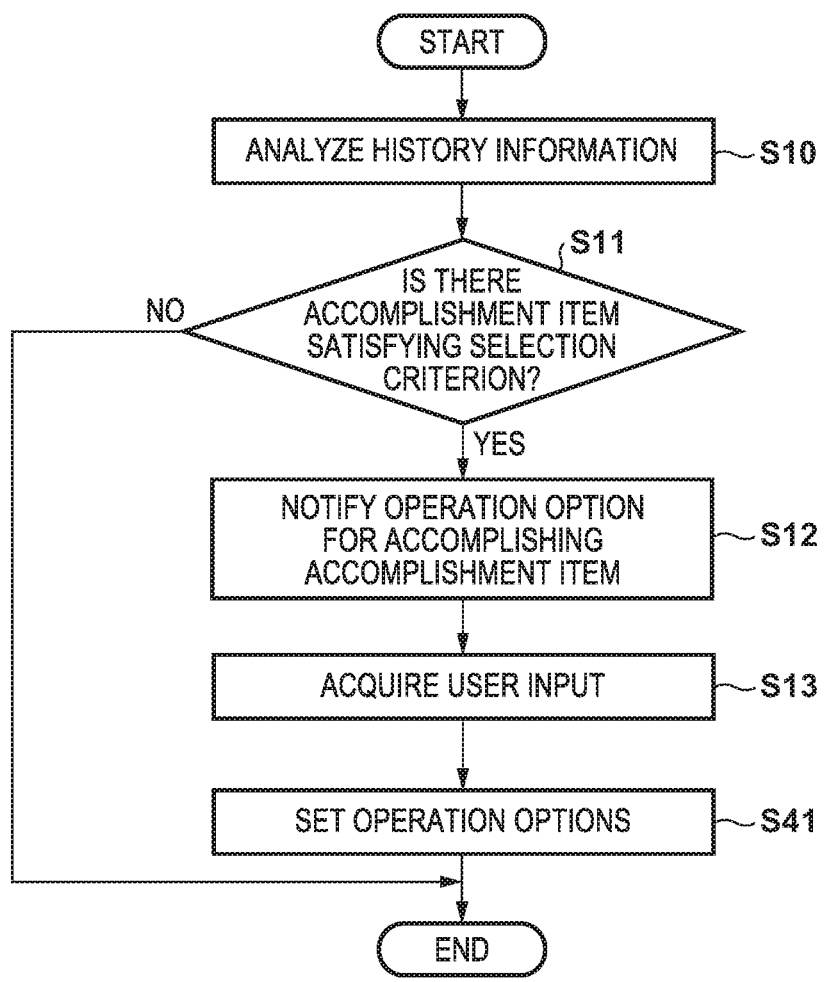
FIG. 4 is a flowchart of operation control of the image forming apparatus according to one embodiment.

FIG. 4 is a flowchart of processing, executed by the image forming apparatus 203 in the present embodiment, for controlling the operation of the image forming apparatus 203. In step S10, the history analysis unit 402 analyzes a predetermined amount of past history information. Note that the details of the analysis of history information will be described later. In step S11, based on the result of the analysis of the history information by the history analysis unit 402, the selection unit 403 determines whether there is an accomplishment item satisfying a selection criterion. The processing in FIG. 4 is terminated if the selection unit 403 determines that there is no accomplishment item satisfying a selection criterion.

If it is determined that there is an accomplishment item satisfying a selection criterion, the selection unit 403 notifies the acquisition unit 406 of the accomplishment item satisfying a selection criterion. In step S12, the acquisition unit 406 notifies the user of one or more operation options for accomplishing the accomplishment item selected by the selection unit 403, and prompts the user to perform input as to whether or not one or more operation options is to be selected. When the acquisition unit 406 acquires the result of the user's selection of operation options in step S13, the acquisition unit 406 notifies the operation control unit 407 of the result of the selection. In step S14, the operation control unit 407 sets the operation of the image forming apparatus 203 in accordance with the operation options selected by the user. In other words, the operation control unit 407 controls the image forming apparatus 203 so that the image forming apparatus 203 operates in accordance with the operation options selected by the user.

Figure 5:
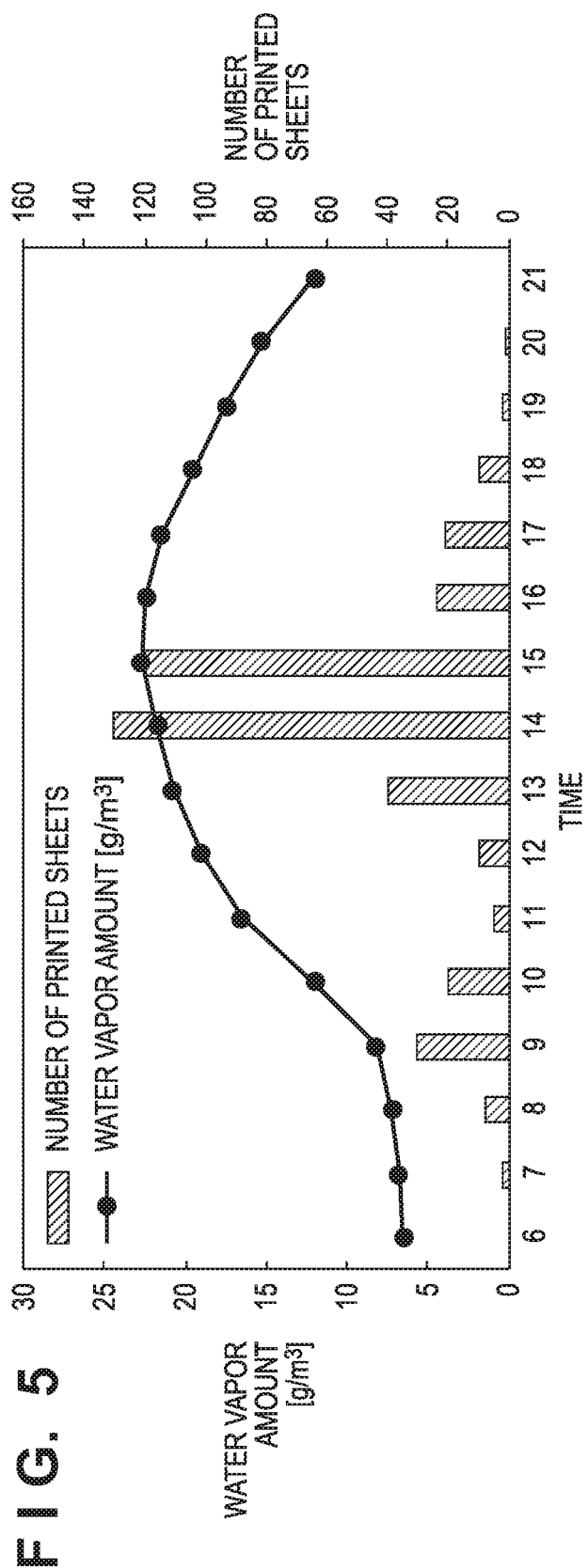
FIG. 5 is a diagram illustrating examples of histories of the number of printed sheets and water vapor amount.

Next, the details of the processing performed by the history analysis unit 402, the selection unit 403, and the acquisition unit 406 will be described. Note that, in the following description, it is supposed that the plurality of accomplishment items that the image forming apparatus 203 can provide are "curl reduction" and "quiet and pleasant sound". First, the selection criterion of the accomplishment item "curl reduction" will be described. It is effective that "curl reduction" be applied in a case in which image forming is mainly performed under a circumstance in which curling is likely to occur and a sheet type prone to curling is frequently used. Accordingly, in the present example, the selection criterion of "curl reduction" is that image forming is mainly performed under a circumstance in which curling is likely to occur and a sheet type prone to curling is frequently used. Curling is likely to occur if the water vapor amount in the space is high. Note that the water vapor amount in the space can be calculated based on the humidity and the saturation water vapor amount, which indicates the water vapor amount that can be present in the space. In the present example, the water vapor amount threshold (referred to hereinafter as a "first threshold") for determining whether or not the circumstance is that in which curling is likely to occur is set to 20 g/m$^3$. Note that the saturation water vapor amount can be calculated based on temperature. Accordingly, the history analysis unit 402 analyzes a history of the saturation water vapor amount based on the temperature information indicated by the environment history information. Also, the history analysis unit 402 analyzes a history of the humidity based on the humidity information indicated by the environment history information. Furthermore, the history analysis unit 402 calculates a history of the water vapor amount in the space based on the history of the saturation water vapor amount and the history of the humidity. FIG. 5 illustrates one example of an analysis result of the water vapor amount. In FIG. 5, the water vapor amount exceeds 20 g/m$^3$, which is the first threshold, between 13:00 and 17:00. Here, the analysis result illustrated in FIG. 5 is a history for a given date. However, the average of water vapor amounts of the same time period over the past few days can also be adopted as the analysis result.

FIG. 5 also illustrates the number of printed sheets (number of image-formed sheets) for each hour, which can be calculated from the print history information. From FIG. 5, it can be seen that curling is likely to occur between 13:00 and 17:00. In the present example, the user is determined as being a user who mainly uses the image forming apparatus 203 in an environment in which curling is highly likely to occur if the ratio of sheets printed during a time period during which curling is likely to occur (13:00 to 17:00) to the total number of sheets printed is greater than a second threshold. For example, if the second threshold is 70%, the selection unit 403 determines that the user is a user who mainly uses the image forming apparatus 203 in an environment in which curling is highly likely to occur if the ratio of the total number of sheets printed between 13:00 to 17:00 to the total number of sheets printed in the graph illustrated in FIG. 5 is greater than 70%.

Figure 6:
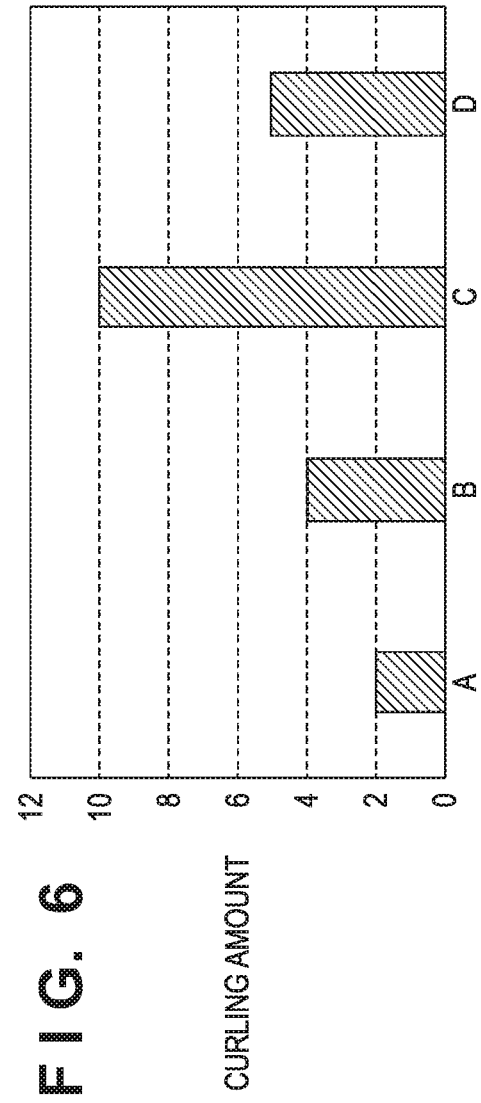
FIG. 6 is a diagram of an example of a relationship between sheet types and curling amounts.

Furthermore, the likeliness of curling occurring is also dependent on sheet type. FIG. 6 illustrates measurement results of curling amounts of sheets of different types having a moisture content of a predetermined value or more. From FIG. 6, it can be seen that the likeliness of curling occurring is higher for a sheet of type C compared to sheets of types A, B, and D. In the present example, the usage ratios of individual sheet types are determined based on the print history information, and it is determined that the user is a user who frequently uses a sheet type prone to curling if the usage ratio of sheets of type C is greater than a third threshold. For example, if the third threshold is 50%, the selection unit 403 determines that the user is a user who frequently uses a sheet type prone to curling if the ratio of the sheets of type C used for printing is greater than 50% in FIG. 5.

The selection unit 403 determines that the selection criterion of the accomplishment item "curl reduction" is satisfied if the user is a user who mainly uses the image forming apparatus 203 in an environment in which curling is highly likely to occur and is a user who frequently uses a sheet type prone to curling, and provides the acquisition unit 406 with a notification of "curl reduction". Note that the selection criterion of "curl reduction" is not limited to the criterion described in the present example. For example, a configuration can be adopted in which the selection unit 403 selects the accomplishment item "curl reduction" for a user who mainly uses the image forming apparatus 203 in an environment in which curling is highly likely to occur. Also, a configuration can be adopted in which the selection unit 403 selects the accomplishment item "curl reduction" for a user who frequently uses a sheet type prone to curling. Furthermore, a configuration can be adopted in which the selection unit 403 selects the accomplishment item "curl reduction" if the ratio of sheets of a sheet type prone to curling (type C) to the total number of sheets printed during a time period during which curling is likely to occur (13:00 to 17:00) is greater than a predetermined threshold.

Next, the selection criterion of the accomplishment item "quiet and pleasant sound" will be described. It is effective that "quiet and pleasant sound" be applied in a case in which the image forming apparatus 203 is used in a quiet environment. Accordingly, in the present example, the selection criterion of "quiet and pleasant sound" is that the image forming apparatus 203 is installed in a quiet environment. Thus, the history analysis unit 402 analyzes the background sound (ambient sound) of the installation environment of the image forming apparatus 203. Specifically, the history analysis unit 402 analyzes a history of sound information for a period during which the state history information indicates the standby state. For example, the history analysis unit 402 calculates the average sound level (dB) every hour during a period in which the image forming apparatus 203 is in the standby state. FIG. 7 illustrates a result of the analysis by the history analysis unit 402. Note that the history analysis unit 402 can perform analysis based on history information for a single day, and can also perform analysis based on history information for the past few days. In a case in which the history information for the past few days is used, average values of the sound level during the same hours are used. The selection unit 403 determines that the selection criterion of "quiet and pleasant sound" is satisfied if the background sound calculated through the analysis is lower than a fourth threshold at any time. For example, if the fourth threshold is 50 dB, the selection unit 403 determines that the selection criterion of "quiet and pleasant sound" is not satisfied in the case of the graph illustrated in FIG. 7 because there is a time period during which 50 dB is exceeded.

For example, suppose that the selection criterion of "curl reduction" is satisfied but the selection criterion of "quiet and pleasant sound" is not satisfied. In this case, the selection unit 403 provides the acquisition unit 406 with a notification of "curl reduction". The acquisition unit 406 displays, on the operation/display unit 205, operation options for accomplishing "curl reduction", which is the accomplishment item for which a notification was provided from the selection unit 403. FIG. 8 is an example of operation option information indicating the operation options for "curl reduction". As illustrated in FIG. 8, the operation option information includes the content of operation options and reference information for the user to determine whether or not the operation options are to be used. Note that the reference information includes information regarding accomplishment degrees (levels of accomplishment) achieved if the operation options are used and information regarding demerits (negative effects) incurred if the operation options are used.

FIG. 8 indicates, for example, that operation option #4 is an operation option of reducing the processing speed to lower than normal, and that the operation option has a high curl reduction accomplishment degree. On the other hand, as the demerits, it is indicated that, by reducing the processing speed, a significant decrease in productivity will occur and the life-span of the image forming apparatus 203 will be slightly affected. Note that it is also indicated that image quality and power consumption will not be affected even if the processing speed is reduced. Note that the operation options are not limited to those illustrated in FIG. 8, and, for example, an increase in sheet interval during continuous printing may also be one operation option for curl reduction.

The acquisition unit 406 displays, on the operation/display unit 205, the screen illustrated in FIG. 9, for example, in accordance with the information illustrated in FIG. 8, and has the user select which operation option is to be used and which operation option is not to be used. Note that, as for the demerits, only the items having the greatest influence are displayed in FIG. 9. However, a form in which all items are displayed may be adopted. For each of the operation options that are displayed, the user performs input to select (use) an operation option. The acquisition unit 406 notifies the operation control unit 407 of the result of the user's selection. The operation control unit 407 controls the image forming apparatus 203 so that the image forming apparatus 203 operates in accordance with the operation options selected by the user. For example, suppose that the user selects only the first and fourth operation options. In this case, the operation control unit 407 extends the pre-rotation of the fixing unit 13 to be longer than a reference value, and also makes the processing speed lower than a reference speed. Note that the operation control unit 407 does not decrease the toner amount or fixing temperature, and does not perform the heating of the fixing unit 13 during standby.

As described above, an accomplishment item that the user is to be notified of is selected based on history information, and the user is notified of operation options for accomplishing content corresponding to the selected accomplishment item, along with the effects and demerits of the operation options, to have the user perform a selection. Due to this configuration, the operation of the image forming apparatus 203 can be made suited to the user. Note that the accomplishment items that can be presented to a uses, the selection criteria of the accomplishment items, and the content of the analysis that the history analysis unit 402 performs to determine whether or not the selection criteria are satisfied are stored in a memory of the image forming apparatus 203 beforehand. Furthermore, the operation option information for each of the accomplishment items that can be presented to a user is also stored in the memory of the image forming apparatus 203 beforehand. Note that the ROM 208 of the printer engine 206, for example, can be used as the memory in which such pieces of information are stored. The video controller 204 and the printer engine 206 can each access such pieces of information stored in the ROM 208. The memory in which the above-described pieces of information are stored is not limited to the ROM 208, and a configuration can be adopted in which the above-described pieces of information are stored in one or more memories of the image forming apparatus 203.

Second Embodiment

Next, the second embodiment will be described, mainly focusing on the differences from the first embodiment. FIG. 10 is a functional block diagram relating to control of the image forming apparatus 203 according to the present embodiment. In the present embodiment, the selection unit 403 includes a storage unit 1001. The storage unit 1001 stores a result of the user's selection of operation options for accomplishing an accomplishment item that the user was notified of in the past. If there is a new accomplishment item to be presented to the user, the selection unit 403 judges whether or not an operation option for the new accomplishment item can be used without notifying the user, based on the result, stored in the storage unit 1001, of the user's selection of operation options for another accomplishment item. Furthermore, if it can be judged that an operation option for the new accomplishment item can be used without notifying the user, the operation control unit 407 is notified of the operation option for the new accomplishment item. On the other hand, if it cannot be judged that an operation option for the new accomplishment item can be used without notifying the user, processing similar to that in the first embodiment is performed.

Figure 11:
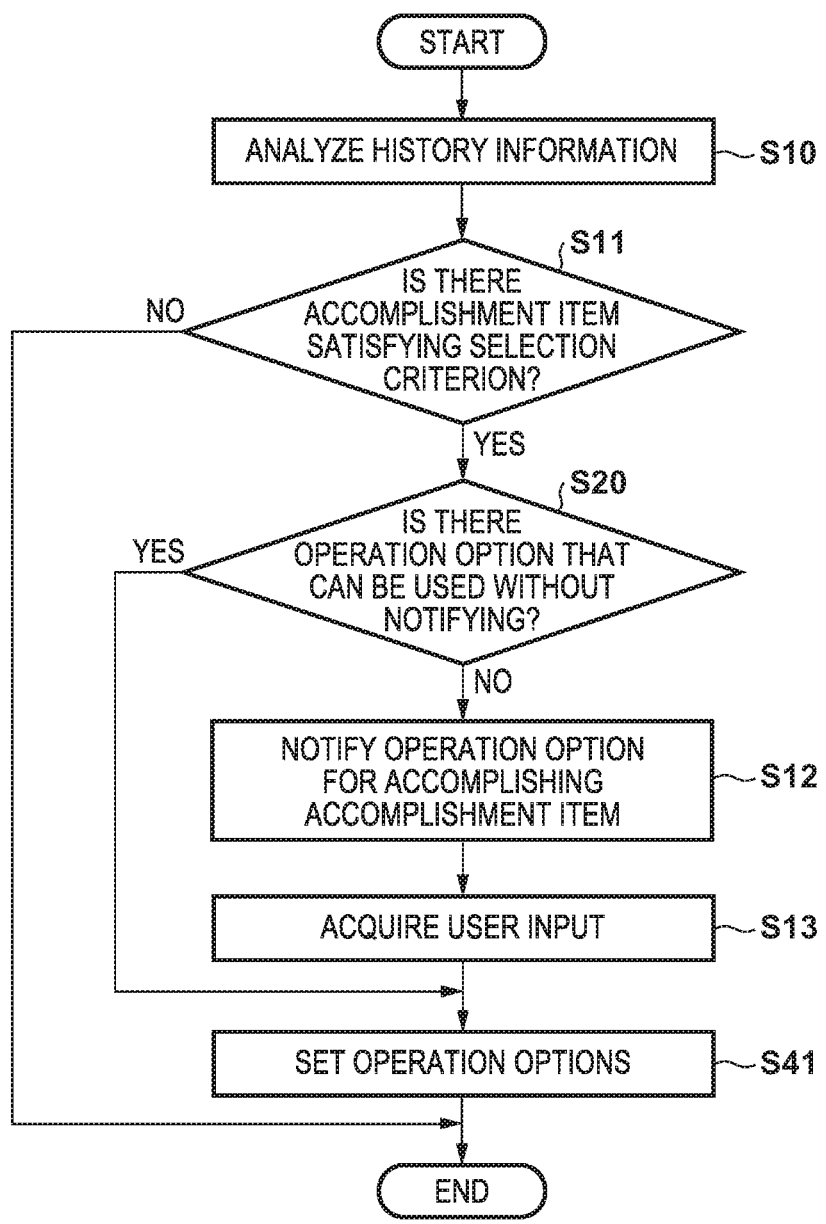
FIG. 11 is a flowchart of operation control of the image forming apparatus according to one embodiment.

FIG. 11 is a flowchart of processing, executed by the image forming apparatus 203 in the present embodiment, for controlling the operation of the image forming apparatus 203. Note that processing steps similar to those in the flow in the first embodiment illustrated in FIG. 4 will be provided with the same step numbers and description thereof will be omitted. If the selection unit 403 determines in step S11 that there is an accomplishment item (second accomplishment item) satisfying a selection criterion, in step S20, the selection unit 403 refers to the result, stored in the storage unit 1001, of the user's selection of operation options for an accomplishment item (first accomplishment item) that the user was notified of in the past. Here, if no user selection result is stored in the storage unit 1001, in step S20, the selection unit 403 determines that there is no operation option for the second accomplishment item that can be used without notifying the user. On the other hand, if the result of the user's selection of operation options for the first accomplishment item is stored, the selection unit 403 determines the demerits of the operation options for the first accomplishment item selected by the user in the past. The demerits of the operation options for the first accomplishment item selected by the user in the past can be determined as being demerits that the user is willing to accept. Accordingly, if there is an operation option for the second accomplishment item that only has demerits included among the demerits of an operation option selected by the user in the past, in step S20, the selection unit 403 determines that there is an operation option for the second accomplishment item that can be used without notifying the user. Note that, if the result of the user's selection of an operation option for the second accomplishment item is stored in the storage unit 1001, the operation option is used as-is.

If the selection unit 403 determines, in step S20, that there is no operation option for the second accomplishment item that can be used without notifying the user, the processing following this step is similar to that in the first embodiment. On the other hand, if the selection unit 403 determines, in step S20, that there is an operation option for the second accomplishment item that can be used without notifying the user, the selection unit 403 selects the operation option for the second accomplishment item and notifies the operation control unit 407 of the operation option.

In the following, the present embodiment will be described using a specific example. As illustrated in FIG. 12, suppose that the user was notified of the accomplishment item "curl reduction" in the past, and the user selected operation option #3, i.e., the operation option of heating the fixing unit 13 also during standby. Note that operation option #3 significantly increases power consumption, and thus it can be determined that the user is a user who is willing to accept an increase in power consumption. Suppose that the selection criterion of the accomplishment item "quiet and pleasant sound" is satisfied in this state. As illustrated in FIG. 12, there are two operation options for "quiet and pleasant sound". Option #1 increases the rotation speed of a fan. This option, as a result of increasing the rotation speed of a fan, suppresses sheet conveyance noise and a fluctuation in motor operation sound that is unpleasant to the user. Because option #1 increases the fan rotation speed at all times, there is a demerit in that power consumption increases. On the other hand, option #2 suppresses operation sound by reducing processing speed, and while the option does not affect power consumption, a significant decrease in productivity is incurred.

In this case, in step S20 in FIG. 11, the selection unit 403 determines that operation option #1 for "quiet and pleasant sound" can be used without notifying the user. This is because the user has selected operation option #3 for curl reduction, and the demerits of operation option #3 for curl reduction include the demerit of operation option #1 for quiet and pleasant sound. Accordingly, the selection unit 403 provides the operation control unit 407 with a notification to increase the rotation speed of a fan to be higher than a reference rotation speed.

As described above, based on demerits of an operation option for another accomplishment item selected by the user in the past, it is determined whether or not an operation option that can be selected without notifying the user is present among the operation options for an accomplishment item that has newly satisfied a selection criterion. Due to this configuration, the operation of the image forming apparatus 203 can be made suited to the user without operations being made by the user.

Third Embodiment

Next, the third embodiment will be described, mainly focusing on the differences from the first embodiment. FIG. 13 is a functional block diagram relating to control of the image forming apparatus 203 according to the present embodiment. In the present embodiment, the video controller 204 includes an acquisition unit 1300 in addition to the acquisition unit 406. Furthermore, in the present embodiment, the user is notified of operation options for an accomplishment item and the result of the user's selection is acquired, and the operation control unit 407 controls the image forming apparatus 203 in accordance with the operation option selected by the user, as described in the first embodiment. However, in the present embodiment, application levels are provided for each operation option. FIG. 14 illustrates examples of application levels of operation options #1 and #4 for "curl reduction". For operation option #1, four application levels from 0 to 3 are provided. Note that the greater the application level, the longer the time by which pre-rotation is extended. The longer the time for pre-rotation is made, the greater the curl reduction effect, but power consumption increases and productivity decreases. In other words, the accomplishment degree of the accomplishment item increases but demerits also increase as the application level increases. For operation option #4, three application levels from 0 to 2 are provided. Similarly, the accomplishment degree of the accomplishment item increases but the demerits also increase if the application level increases. Note that one of the plurality of application levels is the default level, and the operation control unit 407 initially applies the default level. For example, suppose that the default level of operation option #1 is level 2, and the default level of operation option #4 is level 1. Furthermore, suppose that the user has selected operation options #1 and #4 as a result of the user being notified of the operation options for "curl reduction". In this case, the operation control unit 407 controls the image forming apparatus 203 so that pre-rotation is extended by 10 seconds and the processing speed is half the reference speed.

The acquisition unit 1300 displays the screen illustrated in FIG. 15, for example, on the operation/display unit 205 at a predetermined timing after the control of the operation of the image forming apparatus 203 is started based on the user's selection. Note that the timing when a predetermined number of sheets have been printed or when a predetermined amount of time has elapsed after the operation control unit 407 changes the operation of the image forming apparatus 203 based on the result of the user's selection can be set as the predetermined timing. FIG. 15 is a screen for the user to input a result of user determination (an evaluation result) of the accomplishment degree of the provided "curl reduction" and for the user to input whether or not the operation of the image forming apparatus (printer) 203 after the change for "curl reduction" was within an acceptable range of the user. Following the screen illustrated in FIG. 15, the user performs input as to whether or not "curl reduction" was accomplished and whether or not the operation of the image forming apparatus 203 was acceptable. The acquisition unit 1300 notifies the operation control unit 407 of the user input.

Based on the user input, the operation control unit 407 controls the application levels of the operation options currently selected by the user. FIG. 16 illustrates an example of a method for controlling application levels that is implemented by the operation control unit 407. For example, if the user selects "accomplished" and "unacceptable" for "curl reduction", the operation control unit 407 lowers the application levels of the operation options currently selected by the user by one level. For example, supposing that the user has selected operation options #1 and #4 in FIG. 14 and the default levels are currently applied, operation option #1 is changed from level 2 to level 1, and operation option #4 is changed from level 1 to level 0. On the other hand, if the user selects "unaccomplished" and "acceptable", the operation control unit 407 raises the application levels of the operation options currently selected by the user by one level. Note that the operation control unit 407 maintains the currently-applied levels if combinations other than these are input. The acquisition unit 1300 displays the screen illustrated in FIG. 15 at a predetermined timing after the operation control unit 407 changes the application levels, and optimizes the application levels based on user input. Note that, in a case in which the user has selected a plurality of operation options, a configuration can be adopted in which the level of one of the operation options is changed, rather than adopting a configuration in which the levels of all of the currently-selected operation options are changed. Furthermore, in a case in which the current level is the lowest level, the current level is naturally maintained even if "accomplished" and "unacceptable" are selected. This similarly applies to a case in which the current level is the highest level.

As described above, feedback from the user is acquired at a predetermined timing after the operation of the image forming apparatus 203 is changed in accordance with selected operation options. For example, the content of the feedback acquired can be the accomplishment degree of the accomplishment item and whether or not the operation of the image forming apparatus 203 was acceptable. The operation of the image forming apparatus 203 can be made suited to the user by controlling the application levels of operation options based on feedback from the user. Note that, while application levels are controlled in the present embodiment based on both the user evaluation of the accomplishment degree and the evaluation of whether or not the operation of the image forming apparatus 203 was within an acceptable range, a configuration can be adopted in which application levels are controlled based on only one of these evaluations.

Fourth Embodiment

In the above-described embodiments, the history collection unit 401, the history analysis unit 402, and the selection unit 403 are provided inside the image forming apparatus 203. However, a configuration can be adopted in which at least some of these units are provided in a server apparatus outside of the image forming apparatus 203. In other words, the present invention provides an image forming system including the image forming apparatus 203 and a server apparatus. Note that the image forming apparatus 203 and the server apparatus are configured to be capable of performing direct communication with one another in a wired or wireless manner. Alternatively, the image forming apparatus 203 and the server apparatus are configured to be capable of communication with one another via a network.

For example, a configuration can be adopted in which the history collection unit 401 is provided in the server apparatus. In this case, the printer engine 206 transmits history information to the server apparatus. Then, at a predetermined timing, the history analysis unit 402 acquires the history information from the server apparatus and performs analysis. Also, a configuration can be adopted in which the history collection unit 401 and the history analysis unit 402 are provided in the server apparatus. In this case, the printer engine 206 transmits history information to the server apparatus, and the history analysis unit 402 in the server apparatus analyzes the history information. Then, the selection unit 403 acquires the result of the analysis by the history analysis unit 402 at a predetermined timing, selects an accomplishment item satisfying a selection criterion, and notifies the acquisition unit 406 of the selected accomplishment item. Furthermore, a configuration can be adopted in which the history collection unit 401, the history analysis unit 402, and the selection unit 403 are provided in the server apparatus. In this case, the printer engine 206 transmits history information to the server apparatus, and the history analysis unit 402 in the server apparatus acquires the history information and performs analysis. Then, the selection unit 403 in the server apparatus acquires the result of the analysis by the history analysis unit 402 at a predetermined timing, selects an accomplishment item satisfying a selection criterion, and notifies the acquisition unit 406 of the selected accomplishment item.

Other Embodiments

Note that an information processing apparatus is provided according to another embodiment of the present invention. The information processing apparatus has a configuration similar to those illustrated in FIG. 3, 10, or 13. The information processing apparatus includes a display control unit that displays, on the operation/display unit 205, an accomplishment item relating to operation of the image forming apparatus and one or more operation options related to the operation of the image forming apparatus that are for accomplishing the accomplishment item. For example, the display control unit corresponds to the video controller 204. The display control unit 205 displays, on the operation/display unit 205, reference information for the user to determine whether or not to select an operation option. For example, the reference information includes information indicating demerits incurred if the operation options are used and information indicating accomplishment degrees of the accomplishment item achieved if the operation options are used. Furthermore, the information processing apparatus includes an input unit for receiving input of a result of a selection of whether or not the one or more operation options are to be used. The input unit corresponds to the operation/display unit 205.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-109624, filed on Jun. 12, 2019, which is hereby incorporated by reference herein in its entirety.

What is claimed is:

1. An image forming apparatus configured to form an image on a sheet, comprising:
   a display;
   an input interface; and
   a processor configured to:
      collect history information relating to the image forming apparatus;
      select a first accomplishment item in a case where first history information is collected;
      select a second accomplishment item which is different from the first accomplishment item in a case where second history information which is different from the first history information is collected;
      display one or more operation options on the display, the one or more operation options being for accomplishing the first accomplishment item or the second accomplishment item selected;
      acquire, from the input interface, a selection result of whether or not the one or more operation options are to be used; and
      control an operation of the image forming apparatus in accordance with the selection result,
      wherein the one or more operation options each have a plurality of application levels corresponding to varying values of a parameter, and
      the processor is further configured to control the operation of the image forming apparatus in accordance with one of the plurality of application levels of a selected operation option of the one or more operation options for accomplishing a selected accomplishment item.

2. The image forming apparatus according to claim 1, wherein one of the plurality of application levels of each of the operation options is a default level, and
   the processor is further configured to, upon acquiring the selection result indicating the selected operation option, control the operation of the image forming apparatus in accordance with the default level of the selected operation option.

3. The image forming apparatus according to claim 1, wherein the processor is further configured to, at a predetermined timing after the processor starts controlling the operation of the image forming apparatus in accordance with one of the plurality of application levels of the selected operation option, prompt a user to perform input of an evaluation by the user of an accomplishment degree of the selected accomplishment item.

4. The image forming apparatus according to claim 1, wherein the processor is further configured to, at a predetermined timing after the processor starts controlling the operation of the image forming apparatus in accordance with one of the plurality of application levels of the selected operation option, prompt a user to perform input of an evaluation by the user of whether or not the operation of the image forming apparatus was within an acceptable range.

5. The image forming apparatus according to claim 1, wherein the processor is further configured to, at a predetermined timing after the processor starts controlling the operation of the image forming apparatus in accordance with one of the plurality of application levels of the selected operation option, prompt a user to perform input of an evaluation by the user of an accomplishment degree of the selected accomplishment item and an evaluation by the user of whether or not the operation of the image forming apparatus was within an acceptable range.

6. The image forming apparatus according to claim 5, wherein the processor is further configured to control an application level of the selected operation option based on one or both of the evaluation by the user of the accomplishment degree of the selected accomplishment item and the evaluation by the user of whether or not the operation of the image forming apparatus was within the acceptable range.

7. The image forming apparatus according to claim 1, wherein the processor is further configured to:
   determine whether selection criteria of the first accomplishment item and the second accomplishment item are satisfied based on the history information, and
   select one or more of the first accomplishment item and the second accomplishment item whose selection criterion is satisfied.

8. The image forming apparatus according to claim 7, wherein the first accomplishment item relates to operation sound of the image forming apparatus, and
   the selection criterion of the first accomplishment item is satisfied if a background sound of an environment in which the image forming apparatus is installed does not exceed a first threshold.

9. The image forming apparatus according to claim 8, wherein the processor is further configured to collect, as the history information, sound information using a microphone while the image forming apparatus is in a standby state, and
   the first history information is sound information indicating that the selection criterion of the first accomplishment item is satisfied.

10. The image forming apparatus according to claim 7,
wherein the second accomplishment item relates to curling of sheets on which the image forming apparatus forms images, and
the selection criterion of the second accomplishment item is satisfied if a ratio of sheets on which images are formed during a time period in which the curling is likely to occur is greater than a second threshold.

11. The image forming apparatus according to claim 10,
wherein the processor is further configured to collect, as the history information, temperature and humidity information detected by a thermometer and a hygrometer of the image forming apparatus, and
the second history information is the temperature and humidity information indicating that the selection criterion of the second accomplishment item is satisfied.

12. The image forming apparatus according to claim 7,
wherein the second accomplishment item relates to curling of sheets on which the image forming apparatus forms images, and
the selection criterion of the second accomplishment item is satisfied if a ratio at which sheets of a sheet type prone to the curling are used for image forming is greater than a third threshold.

13. The image forming apparatus according to claim 7,
wherein the second accomplishment item relates to curling of sheets on which the image forming apparatus forms images, and
the selection criterion of the second accomplishment item is satisfied if a ratio of sheets on which images are formed during a time period in which the curling is likely to occur is greater than a second threshold and a ratio at which sheets of a sheet type prone to the curling are used for image forming is greater than a third threshold.

14. The image forming apparatus according to claim 1,
wherein the history information includes at least one of:
print history information regarding a print processing of the sheet,
environment history information regarding an installation environment of the image forming apparatus,
error history information regarding an error occurred in the image forming apparatus, and
state history information regarding a state of the image forming apparatus.

15. The image forming apparatus according to claim 1,
wherein the processor is further configured to display, on the display together with the one or more operation options, reference information to determine whether or not the one or more operation options are to be used.

16. The image forming apparatus according to claim 15,
wherein the reference information includes information indicating demerits incurred if the one or more operation options are used.

17. The image forming apparatus according to claim 15,
wherein the reference information includes information indicating accomplishment degrees of a selected accomplishment item if the one or more operation options are used.

18. The image forming apparatus according to claim 15,
further comprising
a memory configured to store a first operation option, which was selected previously, of the one or more operation options for accomplishing the first accomplishment item,
wherein the processor is further configured to, in a case where the second accomplishment item is selected, determine whether or not a second operation option can be judged from the one or more operation options for accomplishing the second accomplishment item as being usable based on the first operation option.

19. The image forming apparatus according to claim 18,
wherein the processor is further configured to:
display, on the display, information indicating demerits incurred if the one or more operation options are used, as reference information to determine whether or not the one or more operation options are to be used, and
determine whether or not the second operation options can be judged from the one or more operation options for accomplishing the second accomplishment item as being usable based on demerits of the first operation option.

20. The image forming apparatus according to claim 19,
wherein the processor is further configured to, if the second operation option only having a demerit included among the demerits of the first operation option, determine that the second operation option can be judged as being usable.

21. The image forming apparatus according to claim 18,
wherein the processor is further configured to control the operation of the image forming apparatus in accordance with the second operation option in a case where second operation option can be judged as being usable.

22. The image forming apparatus according to claim 18,
wherein the processor is further configured to display, on the display, the one or more operation options for accomplishing the second accomplishment item in a case where no operation option can be judged from the one or more operation options for accomplishing the second accomplishment item as being usable.

23. An image forming system including an image forming apparatus configured to form an image on a sheet, the image forming system comprising:
a display;
an input interface; and
one or more processors configured to:
collect history information relating to the image forming apparatus;
select a first accomplishment item in a case where first history information is collected;
select a second accomplishment item which is different from the first accomplishment item in a case where second history information which is different from the first history information is collected;
display one or more operation options on the display, the one or more operation options being for accomplishing the first accomplishment item or the second accomplishment item selected;
acquire, from the input interface, a selection result of whether or not the one or more operation options are to be used; and
control an operation of the image forming apparatus in accordance with the selection result,
wherein the one or more operation options each have a plurality of application levels corresponding to varying values of a parameter, and
the one or more processors are further configured to control the operation of the image forming apparatus in accordance with one of the plurality of application levels of a selected operation option of the one or more operation options for accomplishing a selected accomplishment item.

24. The image forming system according to claim 23,
wherein the image forming system includes a first processor in a server apparatus that is capable of communicating with the image forming apparatus, the collecting the history information being performed by the first processor, and includes a second processor in the image forming apparatus, the controlling the operation of the image forming apparatus being performed by the second processor.

25. The image forming system according to claim 23, wherein the history information includes at least one of:
print history information regarding a print processing of the sheet,
environment history information regarding an installation environment of the image forming apparatus,
error history information regarding an error occurred in the image forming apparatus, and
state history information regarding a state of the image forming apparatus.

26. The image forming system according to claim 23, wherein the one or more processors are further configured to display, on the display together with the one or more operation options, reference information to determine whether or not the one or more operation options are to be used.

* * * * *